(12) United States Patent
Ganser et al.

(10) Patent No.: US 7,379,238 B2
(45) Date of Patent: May 27, 2008

(54) REFLECTED-LIGHT MICROSCOPE

(75) Inventors: Michael Ganser, Glessen (DE); Albrecht Weiss, Linden (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 10/538,522

(22) PCT Filed: Nov. 13, 2003

(86) PCT No.: PCT/EP03/12671

§ 371 (c)(1), (2), (4) Date: Jun. 10, 2005

(87) PCT Pub. No.: WO2004/053560

PCT Pub. Date: Jun. 24, 2004

(65) Prior Publication Data

US 2006/0056013 A1    Mar. 16, 2006

(30) Foreign Application Priority Data

Dec. 10, 2002 (DE) .............................. 102 57 521

(51) Int. Cl.
G02B 21/00 (2006.01)
(52) U.S. Cl. .................. 359/381; 359/388; 359/389
(58) Field of Classification Search ............ 359/381, 359/388, 389
See application file for complete search history.

(56) References Cited

U.S. PATENT DOCUMENTS

| 3,414,345 | A | 12/1968 | Möllring |
| 4,407,569 | A | 10/1983 | Piller et al. |
| 5,009,488 | A * | 4/1991 | Fay et al. .................... 359/889 |
| 5,838,450 | A * | 11/1998 | McCoy et al. .............. 356/401 |
| 6,243,197 | B1 | 6/2001 | Schalz |
| 6,384,967 | B1 * | 5/2002 | Watanabe et al. ........... 359/385 |
| 6,485,891 | B1 * | 11/2002 | Noguchi et al. ............ 430/311 |
| 6,563,113 | B1 * | 5/2003 | Amann et al. .............. 250/309 |
| 6,636,353 | B2 * | 10/2003 | Yamaguchi et al. ........ 359/381 |
| 6,724,419 | B1 * | 4/2004 | Green et al. ................. 348/79 |
| 2002/0036762 | A1 * | 3/2002 | Nishi ........................ 355/53 |
| 2002/0154303 | A1 * | 10/2002 | Maeda et al. ............... 356/394 |
| 2003/0058530 | A1 * | 3/2003 | Kawano ..................... 359/385 |
| 2003/0227674 | A1 * | 12/2003 | Nihoshi et al. ............. 359/386 |
| 2004/0104359 | A1 * | 6/2004 | Komatsuda et al. ..... 250/492.2 |

FOREIGN PATENT DOCUMENTS

DE    35 38 774 A    5/1987

* cited by examiner

Primary Examiner—Stephone B. Allen
Assistant Examiner—Lee Fineman
(74) Attorney, Agent, or Firm—Houston Eliseeva LLP

(57) ABSTRACT

The invention relates to a reflected-light microscope comprising a light source for generating an illumination light beam, which can be directed through a lens along an illumination beam path onto a sample. Said microscope is provided with imaging optics, which generate a plane that optically corresponds to the pupil plane. At least one attenuation element, which acts in an essentially uniform manner over the entire cross-section of the illumination light beam, can be introduced into the illumination beam path on the optically corresponding plane.

16 Claims, 2 Drawing Sheets

REFLECTED-LIGHT MICROSCOPE

Figure 1:
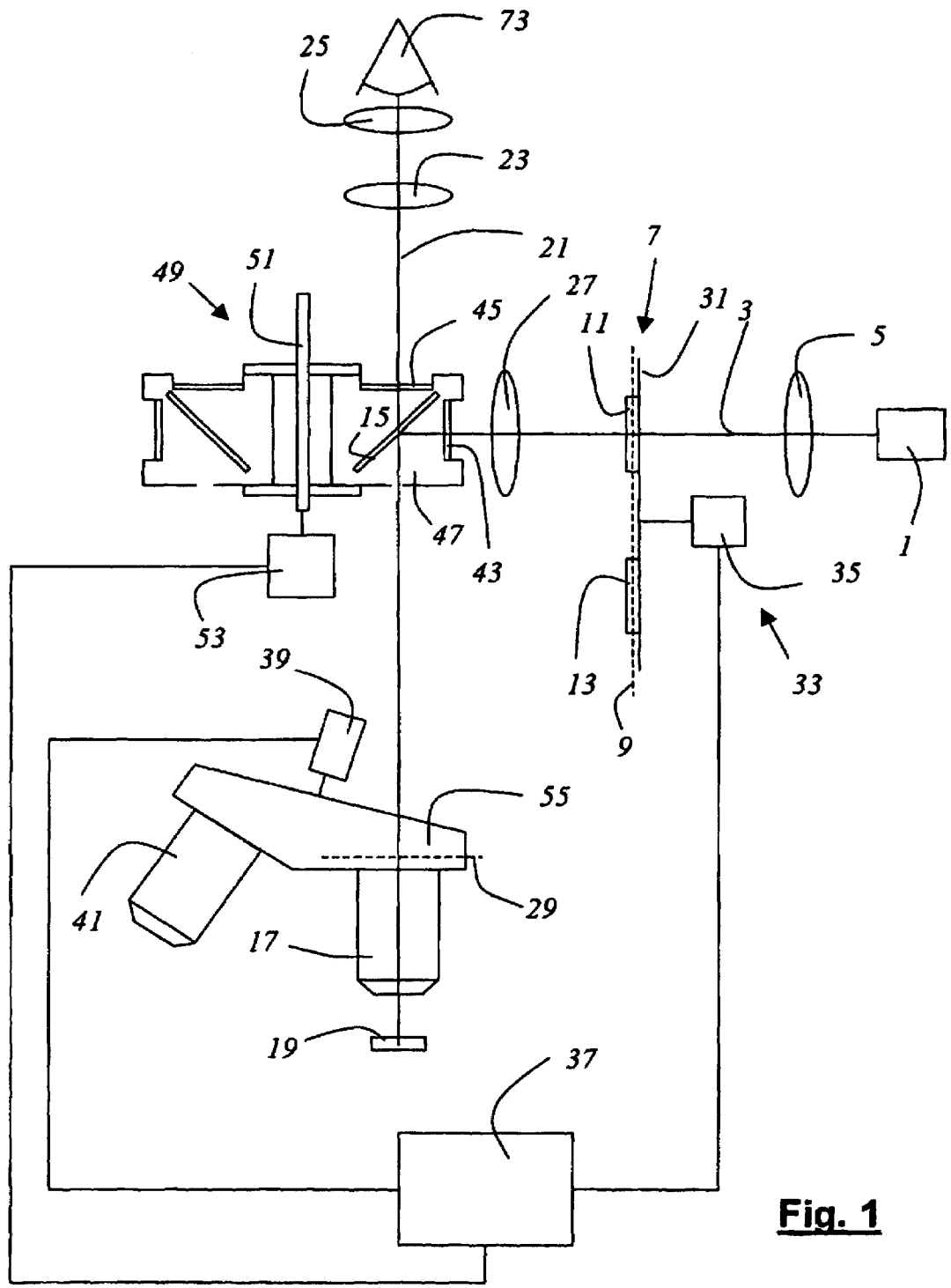

The invention relates to a reflected-light microscope comprising a light source for generating an illumination light beam, which can be directed through a pupil of the objective on the pupil plane along an illumination beam path onto a sample.

A number of ways are known in reflected-light microscopy to vary the light power of the illumination light.

Unexamined German patent application DE 35 38 774 A1 discloses a microscope in which a louver is used to regulate light.

A method is known from unexamined German patent application DE 101 10 389 A1 for automatically adjusting the lamp in a microscope without a beam homogenizer in the illumination beam path, and a microscope equipped to use the method. According to the invention, the light power is integrally measured by a detector in the illumination beam path behind the pupil plane of the microscope lens or behind the pupil plane of the illumination light beam, and the lamp is adjusted relative to the illumination beam path so that the light power detected by the detector is maximal. In a microscope that is capable of automatic lamp adjustment according to the method, after lamp replacement, for example, a motorized drive is provided to adjust the lamp, which is successively controlled by an evaluating and control computer until the maximal light power is detected by a detector.

An apparatus was described in unexamined German patent application DE 35 35 749 A1 to regulate brightness in microscopes that comprises a sensor to determine image brightness in the observation beam path, a switch to regulate the level of the microscope illumination light source, and an arrangement which, controlled by a threshold switch, blanks the beam path when a set maximum light power is exceeded. This prevents the observer from being blinded when changing lenses or when switching to another contrast method.

An illumination apparatus is known from U.S. Pat. No. 6,384,967 for a microscope with a lens turret and an aperture diaphragm device. The aperture diaphragm device exhibits several pinhole apertures on a rotary disk, which can be rotated in the illumination beam path. The illumination apparatus is equipped such that when the lens is replaced the appropriate aperture diaphragm is set in place automatically, and illumination is blocked during the exchange process.

Attention is drawn to the arrangements known from the state-of-the-art to vary the illumination light power, the arrangements generally control beams in the collimated range, and are attached from outside the microscope, have the disadvantage that relatively large attenuating elements must be used to cover the entire diameter of the beam. If these elements are motor-driven, a great deal of inertia must be overcome, which at the very least makes it more difficult to introduce them quickly into the illumination beam path or remove them quickly from the illumination beam path.

The aperture diaphragms described in the already cited U.S. Pat. No. 6,384,967, which can be arranged in the form of pinholes of various size on a rotary disk, are frequently "misused" when regulating light power. In this method, the external portions of the illumination light beam are shaded by the selected aperture diaphragm, and the entire light power of the illumination light beam is reduced as a result. Because the position of the illumination light beam relative to the aperture diaphragm generally fluctuates, and because in addition the cross-section of the illumination light beam is not round—for example, when it is emitted by a filament or arc—the use of aperture diaphragms as an attenuating element frequently leads to extreme fluctuations in time in illumination light power, and is also not reproducible.

The task that forms the basis for the invention is therefore to disclose a reflected-light microscope that permits efficient, reproducible, and reliable adjustment of the illumination light power.

This task is solved by the reflected-light microscope, which comprises a light source to generate an illumination light beam that can be directed through a lens with a pupil plane along an illumination beam path and onto a sample. An imaging optics that generates an optically corresponding plane to the pupil plane, in which case at least one attenuation element that acts in an essentially uniform manner over the entire cross-section of the illumination light beam can be introduced into the illumination beam path on the optically corresponding plane.

The invention has the advantage that it provides a reliable targeted means of reducing the illumination light power in a reflected-light microscope, which avoids fluctuations in time in light power and in addition is reproducible independent of the type of light source.

Because the attenuating element according to the invention is arranged in the illumination light beam on a plane that corresponds optically to the pupil plane of the lens—that is on a Fourier plane to the focal plane of the lens—the structure of the attenuation element, which can, for example, have a grate or sieve structure, is not visible in the sample plane being observed. The sample is consequently not illuminated with a sieve pattern or a pinhole pattern: rather, illumination is reduced over the entire image field. At the same time, undesired changes in light power are avoided because the attenuation element acts over the entire cross-section of the illumination light beam—and not just over marginal areas.

Because the illumination light beam is focused on the plane into which the attenuation element can be introduced and therefore exhibits a small cross-section, the attenuation element can be made compact, which in particular facilitates a reduction in inertia moment, which is advantageous for the rapid motorized introduction, removal, or changing of the attenuation element.

In a preferred development, the attenuation element exhibits a color filter that can be configured to be absorptive or reflective. In another variant, the attenuation element comprises a diffusion disk. The attenuation element, particularly the sieve, grate, or pinhole structure, can, according to the invention, be produced by lithography.

In a preferred embodiment of the invention, a storage mechanism is provided, which holds at least one attenuation element, and which is preferably implemented as a turret or as a push slide or as a rotatable disk. The storage mechanism may hold several attenuation elements that have different levels of attenuation.

In a particularly preferred variant, the storage mechanism exhibits a neutral position that allows the illumination light beam to pass unaffected. Particularly advantageously, the storage mechanism may exhibit a blocking position that interrupts the illumination beam path. The storage mechanism is preferably provided with a drive mechanism, such as a stepper motor, that drives it. In addition, a control mechanism may be provided that controls the drive mechanism.

In a preferred development, the illumination light beam can be automatically attenuated or blocked during lens changes or when exchanged with another optical element that can be arranged in the light beam path, by which means unintended illumination light can be prevented from reaching the eye of the user—for example by reflection or diffusion from mountings or braces. Flashes, which occur frequently and disturb the user while changing, introducing, or removing optical elements do not occur according to the invention. In a particularly advantageous development, the illumination light beam can be automatically attenuated or blocked when introducing or removing filters, filter modules, or beam splitter modules.

In a preferred development, the reflected-light microscope is a fluorescence microscope.

In addition to the described attenuation elements held directly by the storage mechanism, other optical elements can be provided that are not arranged immediately on the plane that corresponds optically to the pupil plane generated by the imaging optic, but which are nonetheless attached to the storage mechanism and can therefore be introduced into the light beam path by it. It is particularly advantageous for other optical elements that are damaged by high light intensities to arrange them outside the optically corresponding plane on which the illumination light beam focuses, and which therefore has a high intensity. Other optical elements may include, for example, filters, especially absorption filters, or additional attenuation elements.

The object of the invention is schematically shown in diagram and will be described below on the basis of figures, in which elements that act the same are given the same reference numbers. The show:

FIG. 1 a reflected-light microscope according to the invention, and

Figure 2:
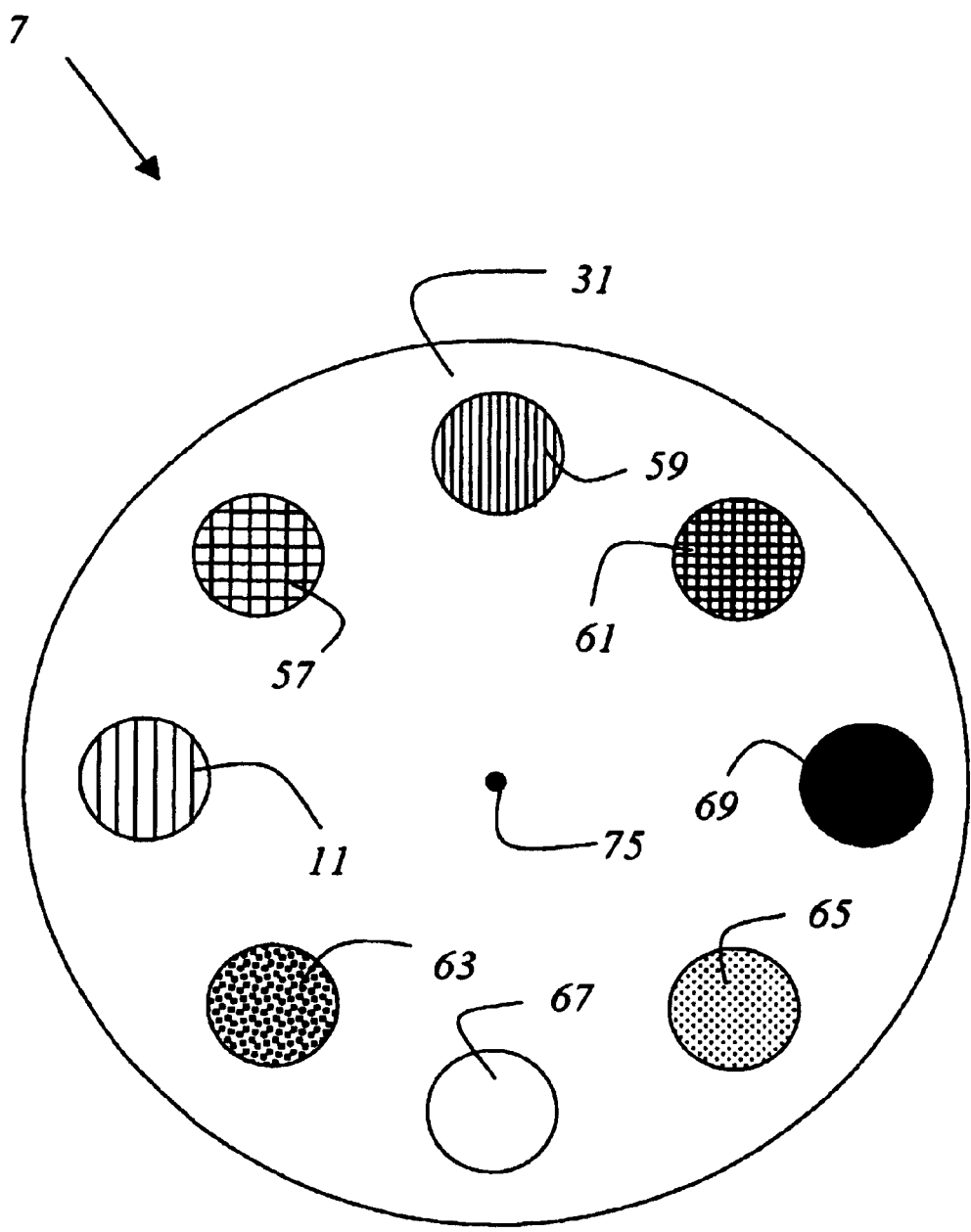

FIG. 2 a storage mechanism with attenuation elements.

FIG. 1 shows a reflected-light microscope according to the invention with a light source 1 for generating an illumination light beam 3. The illumination light beam 3 is focused by an optic 5, reaching a dichroic beam splitter 15 that reflects the illumination light beam 3 to a lens 17 by way of a storage mechanism 7, in which several attenuation elements are arranged that can he introduced into the illumination light path, one attenuation element 11 and a further attenuation element 13, both of which are implemented as fine-meshed grates, and then passes through an imaging optic 27. The lens 17 focuses the illumination light beam 3 on to the sample 19, which is marked with fluorescent dyes. The detection light 21 emitted by the sample reaches the bean splitter 15 by way of the lens 17, passes through it, a tube optic 23, and the ocular 25 before reaching the eye 73 of the user. The storage mechanism 7 is implemented as a turret disk 31 that holds the attenuation elements 11, 13. By rotating the turret disk 31, one of the attenuation elements 11, 13, which afford different degrees of attenuation, can be introduced into the illumination beam path, which permits the degree of attenuation to be adjusted. The attenuation elements 11, 13 are arranged on an optically corresponding plane 9 to the pupil plane 29 of the lens 17, which is generated by the imaging optic 27. The turret disk 31 is driven by a motorized driver 33 that is implemented as a stepping motor 35. The stepping motor 35 is controlled by an electronic control mechanism 37. The lens 17 is screwed into a lens turret 55 that holds another lens 41, which is driven by a motor 39 that is also controlled by an electronic control device. The beam splitter 15 is arranged in a beam splitter filter module 47 that exhibits an excitation filter 43 and a detection filter 45. The beam splitter filter module 47 is arranged in a carousel 49 that permits simple changing of the beam splitter filter module 47 by rotating it around the shaft 51. The carousel 49 is driven by another motor 53 that is controlled by the electronic control mechanism 37.

The turret disk 31 exhibits a neutral position (not shown in this figure) that permits the illumination light beam to pass unaffected as well as a blocking position (also not shown) that interrupts the illumination beam path. The control mechanism 37 is implemented such that the illumination light beam is automatically interrupted when in the blocking position before switching lenses or switching the beam splitter filter module 47, and then released again after the switching process by adjusting it into the neutral position or by introducing a preselected attenuation element 11, 13.

Furthermore, it is envisaged that manual operation of the carousel 49 or of the lens turret 55 is registered by the control mechanism 37, and that it immediately interrupts the illumination beam path by introducing the blocking position.

FIG. 2 shows a storage mechanism 7 that is implemented in the form of a turret disk 31 and exhibits an attenuation element 11 that has a line grating, as well as other attenuation elements 57, 59, 61, 63, and 65 that have a honeycomb structure or pinhole pattern. In addition, a blocking position 67 that is implemented as a black metal plate, and a neutral position 69, that is, a passage opening in the turret disk 31, are provided. Further blocking positions can be provided between all of the attenuation elements, which would accelerate adjustment and avoid the covering of several attenuation elements and thus unintended flashes. The turret disk 31 is borne by and rotatable around a rotational axis 75.

The invention has been described with reference to a particular embodiment. It is evident, however, that changes and modifications can be carried out without relinquishing the scope of protection of the claims below.

REFERENCE LIST

1 Light source
3 Illumination light beam
5 Optic
7 Storage mechanism
9 Optically corresponding plane to the pupil plane 29 of the lens 17
11 Attenuation element
13 Additional attenuation element
15 Dichroic beam splitter
17 Lens
19 Sample
21 Detection light
23 Tube optic
25 Ocular
27 Imaging optic
29 Pupil plane
31 Turret disk
33 Drive mechanism
35 Stepping motor
37 Control mechanism
39 Motor
41 Additional lens
43 Excitation filter
45 Detection filter
47 Beam splitter filter module
49 Carousel
51 Shaft
53 Further motor
55 Lens turret
57 Additional attenuation element
59 Additional attenuation element
61 Additional attenuation element
63 Additional attenuation element
65 Additional attenuation element
67 Blocking position
69 Neutral position 67 Black-colored metal disk
73 Eye
75 Rotational axis

The invention claimed is:

1. A reflected-light microscope comprising:
a light source generating an illumination light beam of the reflected-light microscope directed through a lens along an illumination beam path and onto a sample, the lens having a pupil plane and being disposed in a detection light path:
imaging optics disposed along the illumination beam path and having a corresponding plane which optically corresponds to the pupil plane of the lens by being a Fourier plane of the focal plane of the lens; and
at least one attenuation element disposed in the corresponding plane of the imaging optics along the illumination beam path, the attenuation element comprising structure elements and reducing an illumination light power uniformly over an entire cross-section of the illumination light beam by means of the structure elements.

2. The reflected-light microscope according to claim 1, wherein at least one attenuation element comprises a grate structure or a sieve structure or a pinhole pattern.

3. The reflected-light microscope according to claim 1, wherein at least one attenuation element is a color filter.

4. The reflected-light microscope according to claim 1, wherein at least one attenuation element is a diffusion disk.

5. The reflected-light microscope according to claim 1, wherein at least one attenuation element is produced lithography.

6. The reflected-light microscope according to claim 1, wherein at least one attenuation element is arranged in a storage mechanism.

7. The reflected-light microscope according to claim 6, wherein the storage mechanism is a turret or a push slide or a rotatable disk.

8. The reflected-light microscope according to claim 6, wherein the storage mechanism holds several attenuation elements that exhibit different degrees of attenuation.

9. The reflected-light microscope according to claim 6, wherein the storage mechanism has a neutral position that permits the illumination light beam to pass through without being attenuated.

10. The reflected-light microscope according to claim 6, wherein the storage mechanism has a blocking position that blocks the illumination beam path.

11. The reflected-light microscope according to claim 6, further comprising a drive mechanism that controls the storage mechanism.

12. The reflected-light microscope according to claim 11, wherein the drive mechanism comprises a stepping motor.

13. The reflected-light microscope according to claim 11, further comprising a control mechanism that controls the drive mechanism.

14. The reflected-light microscope according to claim 1, wherein the illumination light beam is automatically attenuated or blocked during lens changes.

15. The reflected-light microscope according to claim 1, further comprising at least one exchangeable optical element disposed in the illumination beam path, wherein the illumination light beam is automatically attenuated or blocked while the optical element is being exchanged.

16. The reflected-light microscope according to claim 1, wherein the reflected-light microscope is a fluorescence microscope.

* * * * *